(12) United States Patent
Kim et al.

(10) Patent No.: US 7,346,723 B2
(45) Date of Patent: Mar. 18, 2008

(54) SLAVE DEVICES AND METHODS FOR OPERATING THE SAME

(75) Inventors: Kyoung-Park Kim, Suwon-si (KR); Sung-Ho Ryu, Suwon-si (KR); Min-Soo Lim, Suwon-si (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 186 days.

(21) Appl. No.: 11/124,271

(22) Filed: May 9, 2005

(65) Prior Publication Data

US 2005/0256986 A1    Nov. 17, 2005

(30) Foreign Application Priority Data

May 14, 2004  (KR) ...................... 10-2004-0034082

(51) Int. Cl.
*G06F 13/14* (2006.01)
(52) U.S. Cl. ...................... 710/305; 710/110; 713/322; 713/500
(58) Field of Classification Search ................ 710/107, 710/315; 713/320, 322, 501, 400; 711/5; 326/93; 327/374; 365/232
See application file for complete search history.

(56) References Cited

U.S. PATENT DOCUMENTS

| | | | | |
|---|---|---|---|---|
| 5,774,702 A | * | 6/1998 | Mitsuishi et al. | ........... 713/501 |
| 5,901,322 A | * | 5/1999 | Herbst et al. | ................ 713/322 |
| 6,115,823 A | * | 9/2000 | Velasco et al. | ............. 713/322 |
| 6,232,820 B1 | * | 5/2001 | Long et al. | .................. 327/374 |
| 6,434,704 B1 | * | 8/2002 | Dean et al. | ................. 713/320 |
| 6,609,209 B1 | * | 8/2003 | Tiwari et al. | ............... 713/322 |
| 6,807,601 B2 | * | 10/2004 | Akiyama | ..................... 710/315 |
| 6,822,481 B1 | * | 11/2004 | Srikantam et al. | ............ 326/93 |
| 6,895,462 B2 | * | 5/2005 | Pertry et al. | .................... 711/5 |
| 6,906,554 B1 | * | 6/2005 | Chen | ........................... 326/93 |
| 6,915,438 B2 | * | 7/2005 | Boros | ......................... 713/322 |
| 7,007,181 B2 | * | 2/2006 | Yamada | ..................... 713/320 |
| 2003/0135676 A1 | * | 7/2003 | Jensen | ....................... 710/107 |
| 2004/0240307 A1 | * | 12/2004 | Kudo | .......................... 365/232 |
| 2005/0028018 A1 | * | 2/2005 | Shikata | ...................... 713/400 |

FOREIGN PATENT DOCUMENTS

| | | |
|---|---|---|
| JP | 6-295243 | 10/1994 |
| JP | 8-83133 | 3/1996 |
| KR | 1997-8802 | 2/1997 |
| KR | 158902 | 8/1998 |
| KR | 1999-0080189 | 11/1999 |

OTHER PUBLICATIONS

Korean Office Action dated Dec. 12, 2005.

* cited by examiner

*Primary Examiner*—Christopher E. Lee
(74) *Attorney, Agent, or Firm*—Harness, Dickey & Pierce, P.L.C.

(57) ABSTRACT

A slave device may be configured to receive at least one bus interface clock and bus interface signals from a bus coupled to the at least one bus interface unit. The slave device may also be configured to operate independently of at least one main function clock.

18 Claims, 5 Drawing Sheets

SLAVE DEVICES AND METHODS FOR OPERATING THE SAME

PRIORITY STATEMENT

This application claims priority under 35 USC § 119 to Korean Patent Application No. 2004-34082, filed on May 14, 2004, in the Korean Intellectual Property Office (KIPO), the contents of which are herein incorporated by reference in its entirety for all purposes.

BACKGROUND OF THE INVENTION

1. Field of the Invention

Example embodiments of the present invention relate to slave devices, which may support dynamic clock gating, and methods of operating the same.

2. Description of the Related Art

Related art portable mobile devices (e.g., mobile phones, personal digital assistants (PDA), laptops, notebook computers, etc.) may draw power from one or more batteries. In such a related art mobile device, power may be preserved by reducing power consumption of components, for example, memories, input and output devices, etc.

Power consumed by a related art mobile device may be divided into, for example, an active power and a stand-by power, and reducing the stand-by power may be more effective and/or easier than reducing the active power. For example, a related art method of reducing an operation clock frequency of component device or a related art method of reducing an operating voltage of the component device may be used to reduce the active power of a related art mobile device.

A related art method known as, for example, dynamic clock gating may be used to disable clocks applied to logic blocks of a related art mobile device when the logic blocks are not enabled such that power consumption due to these clocks may be reduced.

FIG. 1 is a block diagram illustrating a related art clock gating circuit coupled to a target circuit, which may be a target of a dynamic clock gating method.

Referring to FIG. 1, a target circuit 100 may represent a circuit, which may be a target of the related art dynamic clock gating method. For example, the circuit may include operating clocks, which may be dynamically gated in order to reduce power consumption. Clock gating circuit 150 may represent a circuit that performs the dynamic clock gating.

The clock gating circuit 150 may include a d-latch 160 and an AND gate 170. The target circuit 100 may transmit a status signal STATUS to an input node D of the d-latch 160, and an external clock CLK, which may be generated by an external clock source, may be applied to a clock node G of the d-latch 160 and the AND gate 170.

In response to the status signal STATUS, a determination may be made as to whether a gated clock GATED_CLK may be transmitted from the AND gate 170 to the target circuit 100. For example, when the status signal STATUS transmitted to the D-latch 160 has a low logic level (e.g., logic 'L' or '0', and the target circuit 100 is on the process of receiving or transmitting data), the AND gate 170 may be activated and the gated clock GATED_CLK may be provided from the clock gating circuit 150 to the target circuit 100. Alternatively, when the status signal STATUS has a high logic level (e.g., logic 'H' or '1' the target circuit 100 is not on the process of receiving or transmitting data), the AND gate 170 may be deactivated and the gated clock GATED_CLK may be gated, for example, the gated clock GATED_CLK may not be provided to the target circuit 100.

In another example, the related art devices, to which the above power reduction technique may be applied may be coupled, and exchange information, through the bus. The bus may be a communication channel, which may be coupled to various devices, for example, a wire including an address line, a data line and a control line. In addition, the bus may represent a protocol for signal transmission between one or more master device and one or more slave devices.

The master devices may be devices, which may control all, or substantially all, bus operations. The master device may be, for example, a CPU (Central Processing Unit), and several master devices may exist in a bus system. The slave devices may operate in response to commands transmitted from the master devices. The slave devices may interpret commands from the master devices and operate in response to the commands from the master devices.

FIG. 2 is a block diagram of a related art bus system, which may include master devices and slave devices.

Referring to FIG. 2, a related art bus system 200 may include a bus BUS, master devices M01, M02, . . . , and slave devices S01, S02, S03, . . . , which may be coupled to the bus BUS. A related art bus system may also include various components such as bus arbiters and decoders, which are not shown in FIG. 2.

Related art methods may be used for improving performance of the bus system. For example, a related art pipe-lining method may allow bus transactions to begin before previous bus transactions have concluded. The related art pipe-lining method may allow time delays between read (or write) requests and actual read (or write) transactions to be used by the other transactions. A related art pipe-lined bus system may be a bus system, which uses the related art pipe-lining method to improve an overall performance of the bus system. For example, a bus transaction may be divided into several phases including an address phase and a data phase. A related art pipe-lined bus system may start an address phase initiated by a slave device during a data phase of another slave device.

FIG. 3 is a timing diagram illustrating a related art parallel bus operation of several slave devices using a related art pipe-lined bus architecture.

Referring to FIG. 3, an address phase A1 may be an address phase of a first slave device, and an address phase A2 may be an address phase of a second slave device. A data phase D1 may be a data phase of the first slave device and may be based on address information included in the address phase A1. A data phase D2 may be a data phase of the second slave device and may be based on address information included in the address phase A2.

As shown in FIG. 3, the address phase A2 of the second slave device and the data phase D1 of the first slave device may be processed, for example, simultaneously. By using a related art pipe-lined bus architecture, the bus system may increase the throughput of the bus system.

If dynamic clock gating is introduced to the related art pipe-lined bus system, a bus transaction of a slave device may be overlapped by bus transactions of other slave devices. Each slave device may monitor a bus master in order to determine whether an address phase of the new bus transaction designates the respective slave device. However, when an operating clock applied to a slave device is cut off (e.g., interrupted) using dynamic clock gating, the slave device may lose the address phase initiated to the slave device, and each slave device in a related art pipe-lined bus architecture may remain in the active state to detect another address phase. This may result in excessive current consumption in related art pipe-lined bus architectures.

SUMMARY OF THE INVENTION

Example embodiments of the present invention provide slave devices, which may support dynamic clock gating, and methods for operating the same.

An example embodiment of the present invention provides a slave device including at least one bus interface and at least one main function unit. The at least one bus interface unit may be configured to receive at least one bus interface clock and bus interface signals from a bus coupled to the at least one bus interface unit, and configured to operate independently of at least one main function clock. The at least one main function unit may be configured to receive the at least one main function clock and process bus transactions.

Another example embodiments of the present invention provides a slave device for supporting a dynamic clock gating. An example embodiment of the slave device may be configured to receive at least one bus interface clock and bus interface signals from a bus coupled to the at least one bus interface unit, and configured to operate independently of at least one main function clock.

In example embodiments of the present invention, the slave device may further include at least one main function unit configured to receive the at least one main function clock and process bus transactions.

In example embodiments of the present invention, the at least one bus interface clock and the at least one main function clock may be synchronized.

In example embodiments of the present invention, the slave device may be part of a pipe-lined bus system.

In example embodiments of the present invention, the pipe-lined bus system may be an Advanced High-performance Bus (AHB) in an Advanced Microcontroller Bus Architecture (AMBA).

In example embodiments of the present invention, the bus interface unit may further include a transfer detection logic, a plurality of registers, and a signal circuit. The transfer detection logic may be coupled to the bus and may be configured to detect an address phase designated to the slave device. The plurality of registers may be configured to maintain an information of the address phases. The signal circuit may be configured to generate a main function clock request signal and configured to transmit the main function clock request signal to an external dynamic clock gating circuit. The main function clock request signal may indicate whether the at least one main function clock may be applied to the main function unit of the slave device.

In example embodiments of the present invention, the signal circuit may receive a main function clock acknowledge signal, and the main function clock acknowledge signal may indicate that the at least one main function clock may be applied to the main function unit of the slave device.

In example embodiments of the present invention, the main function unit may include a unit for performing a memory-related operation.

In example embodiments of the present invention, the main function unit may include an input/output unit.

Another example embodiment of the present invention provides a method of operating a slave device. An example embodiment of the method may include applying at least one bus interface clock to at least one bus interface unit, deciding whether to operate at least one main function unit, applying at least one main function clock, independently of the at least one bus interface clock, to the at least one main function unit, and interrupting the at least one main function clock, to the at least one main function unit, when the deciding decides not to operate the at least one main function unit.

In example embodiments of the present invention, the deciding may decide to operate the at least one main function unit when the at least one bus interface unit detects an address phase designated to the slave device.

In example embodiments of the present invention, the deciding may include deciding to operate the at least one main function unit when the at least one main function unit has a bus transaction being processed by the at least one bus interface unit.

In example embodiments of the present invention, the applying at least one main function clock may include, applying the main function clock request signal to the external dynamic clock gating circuit, maintaining the at least one bus interface clock applied to the at least one bus interface unit, and applying the at least one main function clock to the main function unit in response to the main function clock request signal.

In example embodiments of the present invention, applying at least one main function clock may further include activating the main function clock acknowledge signal to the bus interface unit of the slave.

In example embodiments of the present invention, interrupting the at least one main function clock may further include deactivating the main function clock request signal to the external dynamic clock gating circuit, maintaining the at least one bus interface clock applied to the at least one bus interface unit, and interrupting the at least one main function clock to the main function unit, in response to the main function clock request signal.

In example embodiments of the present invention, interrupting the at least one main function clock may further include deactivating the main function clock acknowledge signal applied to the bus interface unit of the slave device.

BRIEF DESCRIPTION OF THE DRAWINGS

Example embodiments of the present invention will become more apparent by describing in detail example embodiments of the present invention with reference to the accompanying drawings, in which.

DESCRIPTION OF EXAMPLE EMBODIMENTS OF THE PRESENT INVENTION

Figure 1:
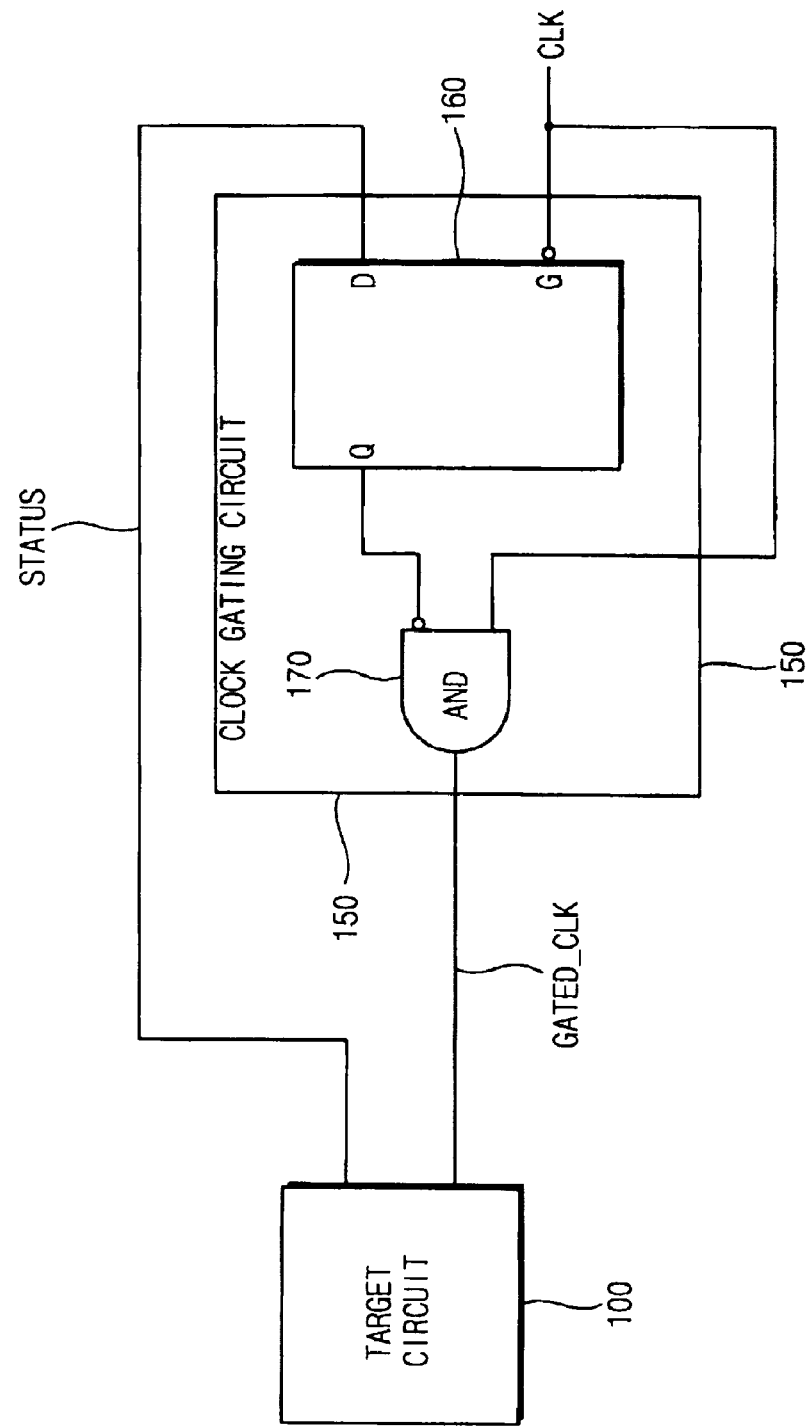
FIG. 1 is a block diagram of a related art clock gating circuit coupled to a clock gated circuit.
Figure 2:
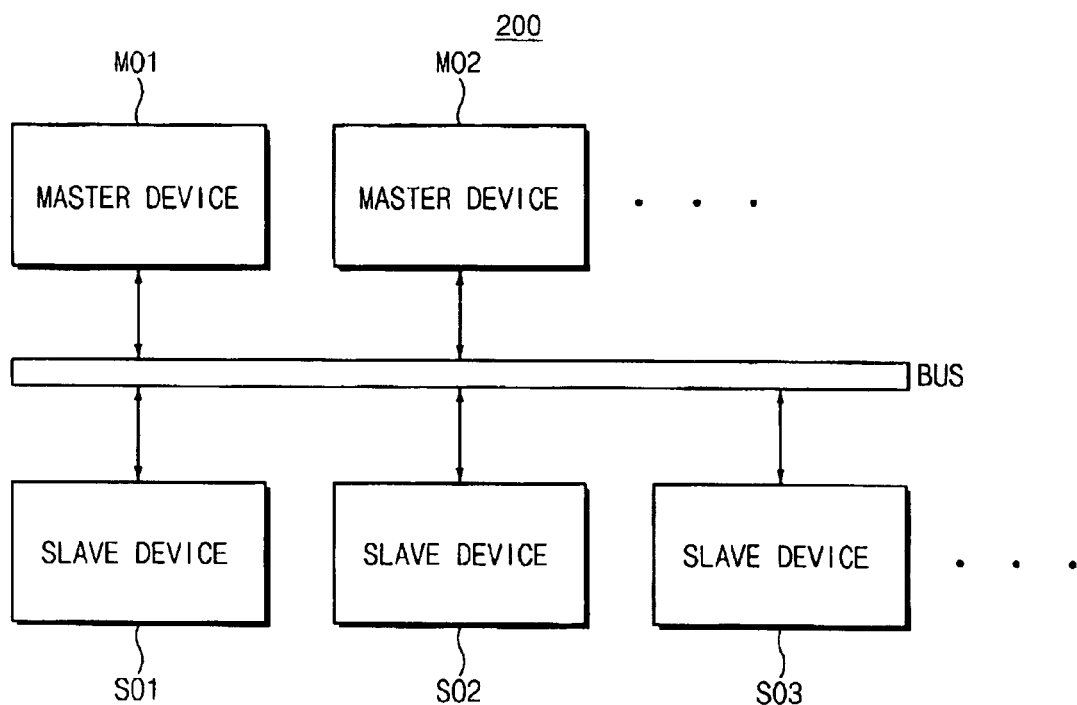
FIG. 2 is a block diagram of a related art bus system having master devices and slave devices.
Figure 3:
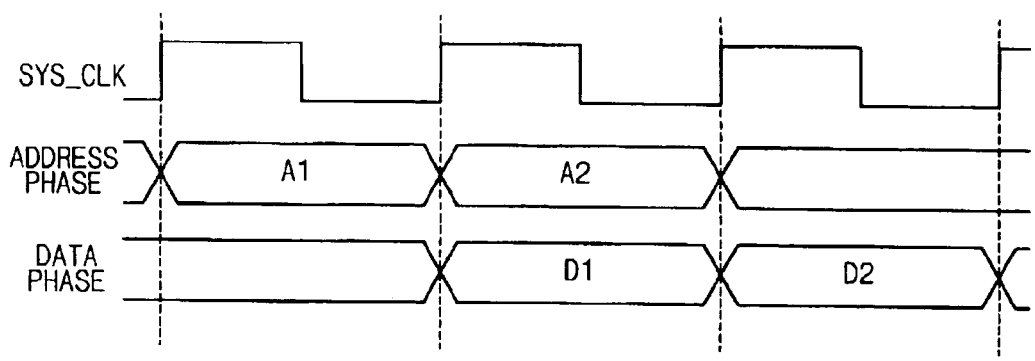
FIG. 3 is a timing diagram illustrating a related art parallel bus operation of several slave devices in a related art pipe-lined bus architecture.

Example embodiments of the present invention are disclosed herein. However, specific structural and functional details disclosed herein are merely representative for purposes of describing example embodiments of the present invention, however, example embodiments of the present invention may be embodied in many alternate forms and should not be construed as limited to example embodiments of the present invention set forth herein.

Example embodiments of the present invention are shown by way of example in the drawings and will herein be described in detail. It should be understood, however, that there is no intent to limit the present invention to the example embodiments disclosed herein, but on the contrary, example embodiments of the present invention should cover all modifications, equivalents, and alternatives falling within the spirit and scope of the invention. Like numbers refer to like elements throughout the description of the figures.

Figure 4:
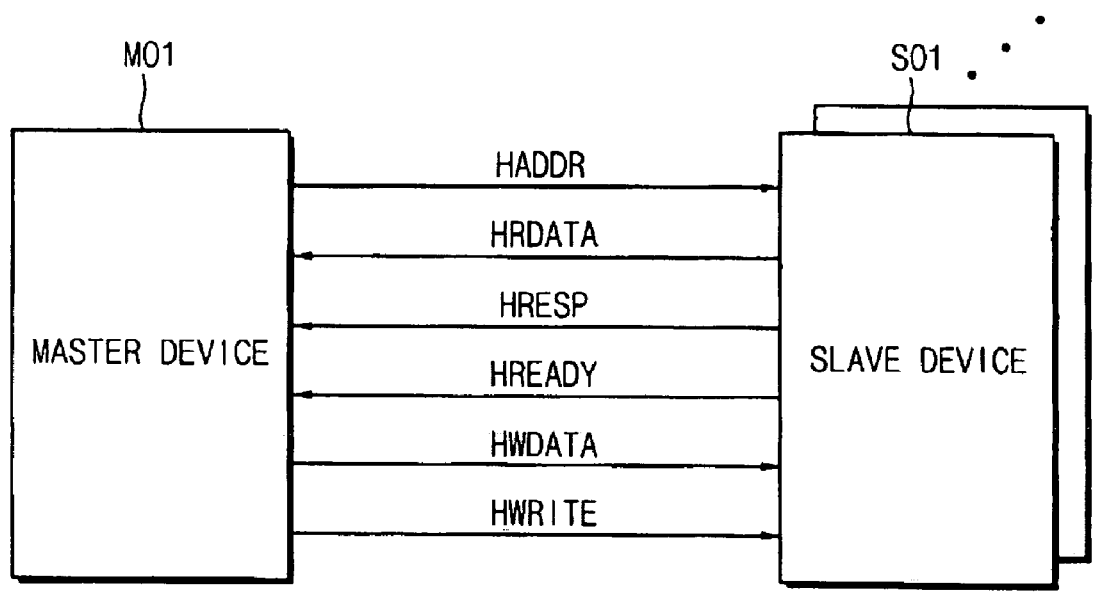
FIG. 4 is a block diagram illustrating example signaling between a master device and slave devices having, for example, an AMBA (or AHB) bus.

FIG. 4 is a block diagram illustrating an example signaling between a master device and a slave device in a bus architecture, according to an example embodiment of the present invention.

Referring to FIG. 4, signals may be transmitted between a master device M01 and one or more slave device(s) S01 in a bus architecture, for example, an AMBA (Advanced Micro-controller Bus Architecture). Example embodiments of the present invention will be described with regard to AMBA (Advanced Micro-controller Bus Architecture) and an AHB (Advanced High-performance Bus), however, it will be understood that any suitable bus architecture, bus specification, and/or bus may be used.

For example, signals between the master device M01 and the slave device(s) S01 may be AHB (Advanced High-performance Bus) signals usable in an AMBA.

Examples of signals, which may be transmitted between the master device M01 and the slave device(s) S01 may be:

HADDR[31:0]: a 32-bit system address bus signal;

HRDATA[31:0]: a 32-bit read data bus signal (transferred from the slave device S01 to the master device M01);

HRESP[1:0]: transfer response;

HREADY: a signal which notifies the master device that the slave device is ready for sending data;

HWDATA[31:0]: a 32-bit write data bus signal (transferred from the master device to the slave device); and HWRITE: a signal which represents whether write transfer is in the process or not (e.g., a write transfer is in the progress when HWRITE is high, and a read transfer is in the progress when HWRITE is low).

Among the above signals, HREADY may be a signal notifying the master device M01 that the slave device S01 may be ready to process new bus transactions. If an HREADY signal is applied to the master device, the master device may begin (e.g., immediately) an address phase of a new bus transaction.

Each slave device in an AHB architecture may remain in an active state to detect an address phase designated to each of the slave device(s), and may consume unnecessary bus resources.

Figure 5:
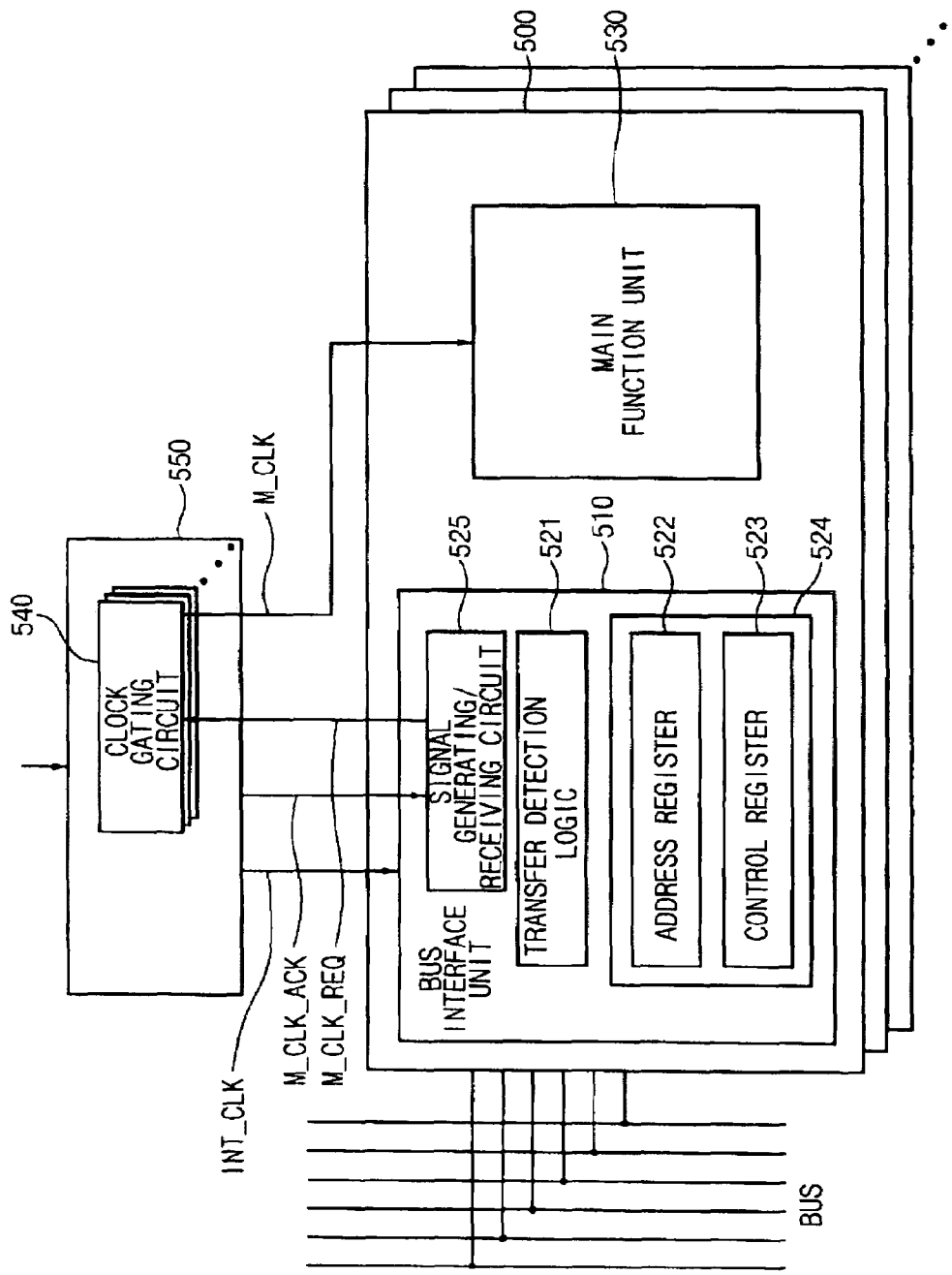
FIG. 5 is a block diagram of a slave device, according to an example embodiment of the present invention.

FIG. 5 is a block diagram of a slave device, according to an example embodiment of the present invention.

Referring to FIG. 5, a slave device 500 may include at least one bus interface unit 510 and at least one main function unit 530. The bus interface unit 510 may be an interface between a bus BUS and a system controller 550. The main function unit 530 may perform a plurality of functions within the slave device. For example, the main function unit 530 may be a memory-related unit, for example, a memory controller for dynamic random access memory (DRAM), synchronous random access memory (SRAM), flash memory (or any suitable memory device), or an input/output unit, for example, a liquid crystal display (LCD) controller, a sound synthesizing unit, or any other suitable input/output device. A bus interface clock INT_CLK may be an interface clock applied to the bus interface unit 510, and M_CLK may be a main function clock fed to the main function unit 530, for example, independently of the bus interface clock INT_CLK. As shown in FIG. 5, at least one bus interface unit 510 may be coupled to the system controller 550 and may be provided with the interface clock INT_CLK. The at least one main function unit 530 may be coupled to the system controller 550 and may be provided with the main function clock M_CLK.

The bus interface unit 510 may include a transfer detection logic 521, a register group 524, which may have address registers 522 and control registers 523, and a signal circuit (e.g., a signal generating/receiving circuit) 525.

The transfer detection logic 521 may monitor (e.g., continuously monitor) the bus BUS to determine when a valid transfer accesses the slave device 500. The address registers 522 and the control registers 523 may store address information and control information from the address phase of the transfer detected by the transfer detection logic 521. The signal circuit (e.g., signal generating/receiving circuit) 525 may operate, for example, in conjunction with the system controller 550 and control dynamic clock gating, which may target the main function unit 530 of the slave device 500. The system controller 550 may include a clock gating circuit 540, which may control the dynamic clock gating to the slave device 500. The clock gating circuit 540 may have configuration similar to that of the clock gating circuit 150 illustrated in FIG. 1, although any other suitable configuration may be used.

The main function clock M_CLK may remain cut-off (e.g., interrupted) when the main function unit 530 does not have to operate, and power consumption by the main function unit 530 may be reduced.

The signal circuit (e.g., signal generating/receiving circuit) 525 may transmit a main function clock request signal M_CLK_REQ to a clock gating circuit 540 included in the system controller 550, for example, when the bus interface unit 510 detects an address phase designated to the slave device 500 and/or when the main function unit 530 has a bus transaction being processed.

In response to the main function clock request signal M_CLK_REQ, the clock gating circuit 540 may apply the main function clock M_CLK to the main function unit 530 and may transmit a main function clock acknowledge signal M_CLK_ACK to the signal generating/receiving circuit 525.

Figure 6:
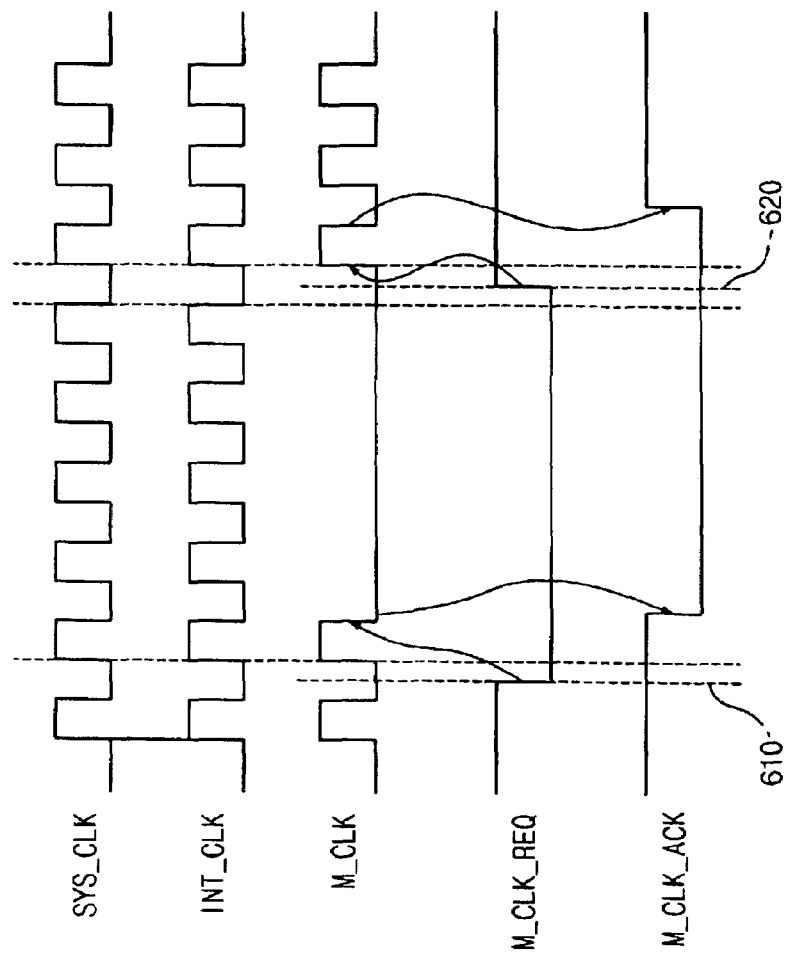
FIG. 6 is a timing diagram illustrating an example procedure for dynamic clock gating of a slave device, according to an example embodiment of the present invention.

FIG. 6 is a timing diagram illustrating an example of dynamic clock gating of a slave device, according to an example embodiment of the present invention.

Referring to FIG. 6, a system clock SYS_CLK may be a system clock (e.g., a heartbeat clock) of a bus system to which the slave device 500, according to an example embodiment of the present invention, belongs.

As shown in FIG. 6, the bus interface clock INT_CLK may be applied (e.g., continuously applied) to the bus interface unit 510, and the bus interface unit 510 may determine when the main function unit 530 has to operate, and/or whether the main function unit 530 has to operate. The bus interface unit 510 may determine whether the main function unit 530 has to operate, for example, if the bus interface unit 510 detects an address phase designated to the slave device 500 and/or if the main function unit 530 has a bus transaction being processed.

The bus interface unit 510 may deactivate the main function clock request signal M_CLK_REQ, for example, at time 610 when the main function unit 530 does not have to operate. The dynamic clock gating circuit 540 may detect the deactivated main function clock request signal M_CLK_REQ and may cut-off (e.g., interrupt) the main function clock M_CLK such that the main function clock M_CLK may not be applied to the main function unit 530. The dynamic clock gating circuit 540 may be implemented in an external device, for example, the system controller 550, as described above, or any other suitable device, either internal or external. The dynamic clock gating circuit 540 may deactivate the main function clock acknowledge signal M_CLK_ACK to notify the bus interface unit 510 that the main function clock M_CLK applied to the main function unit 530 may be cut-off (e.g., interrupted).

The bus interface unit 510 may activate the main function clock request signal M_CLK_REQ at time 620, for example, when the main function unit 530 has to operate. The dynamic clock gating circuit 540 may detect the activated main function clock request signal M_CLK_REQ and may begin applying the main function clock M_CLK to the main function unit 530. The dynamic clock gating circuit 540 may activate the main function clock acknowledge signal M_CLK_ACK to notify the bus interface unit 510 that the main function clock M_CLK is applied to the main function unit 530.

Example embodiments of the present invention may reduce power consumption in slave devices. A dynamic clock gating may be used in a bus architecture (e.g., a pipe-lined bus architecture), and an amount of power consumption in the slave device may be reduced. Example embodiments of the present invention may provide an increase in battery life of electronic devices (e.g., portable mobile devices), which draw power from one or more batteries.

Example embodiments of the present invention have been described with regard to a 32-bit bus architecture. However, it will be understood that example embodiments of the present invention may be implemented, or used in conjunction with, any suitable bus architecture (e.g., 16-bit, 32-bit, 64-bit, etc.).

Example embodiments of the present invention have been described with regard to high logic signals (e.g., logic 'H' or '1') and low logic signals (e.g., logic 'L' or '0') for performing specific operations. However, it will be understood that in example embodiments of the present invention any suitable logic (e.g., 'H', 'L', '0', '1', etc.) signal may be used in connection with performing any operation.

Example embodiments of the present invention being thus described, it is to be understood that the invention defined by the appended claims is not to be limited by the example embodiments of the present invention set forth in the above description as many apparent variations thereof are possible without departing from the spirit or scope thereof as hereinafter claimed.

What is claimed is:

1. A slave device for supporting a dynamic clock gating, the slave device comprising:
    at least one bus interface unit configured to receive at least one bus interface clock and bus interface signals from a bus coupled to the at least one bus interface unit, and configured to operate independently of at least one main function clock; and
    at least one main function unit configured to receive the at least one main function clock and process bus transactions, the at least one main function clock being received independent of the at least one bus interface clock.

2. The slave device of claim 1, wherein the at least one bus interface clock and the at least one main function clock are synchronized.

3. The slave device of claim 1, wherein the slave device is part of a pipe-lined bus system.

4. The slave device of claim 3, wherein the pipe-lined bus system is an Advanced High-performance Bus (AHB) in an Advanced Microcontroller Bus Architecture (AMBA).

5. The slave device of claim 1, wherein the bus interface unit further includes,
    a transfer detection logic, coupled to the bus and configured to detect an address phase designated to the slave device,
    a plurality of registers configured to maintain an information of the address phases, and
    a signal circuit configured to generate a main function clock request signal and configured to transmit the main function clock request signal to an external clock gating circuit, wherein
    the main function clock request signal indicates whether the at least one main function clock is applied to the main function unit of the slave device.

6. The slave device of claim 5, wherein the signal circuit receives a main function clock acknowledge signal from the external clock gating circuit, wherein
    the main function clock acknowledge signal indicates that the at least one main function clock is applied to the main function unit of the slave device.

7. The slave device of claim 1, wherein the main function unit includes a unit for performing a memory-related operation.

8. The slave device of claim 1, wherein the main function unit includes an input/output unit.

9. A method comprising:
    applying at least one bus interface clock to at least one bus interface unit;
    deciding whether to operate at least one main function unit;
    applying at least one main function clock to the at least one main function unit, the at least one main function clock being applied independently of the at least one bus interface clock; and
    interrupting the at least one main function clock when the deciding decides not to operate the at least one main function unit.

10. The method of claim 9, wherein the deciding decides to operate the at least one main function unit when the at least one bus interface unit detects an address phase designated to a slave device by the at least one bus interface unit.

11. The method of claim 9, wherein the deciding includes deciding to operate the at least one main function unit when the at least one main function unit has a bus transaction being processed by the at least one bus interface unit.

12. The method of claim 9, the applying at least one main function clock includes,
    applying a main function clock request signal to an external clock gating circuit,
    maintaining the at least one bus interface clock applied to the at least one bus interface unit, and
    applying the at least one main function clock to the main function unit in response to the main function clock request signal.

13. The method of claim 12, wherein the applying at least one main function clock further includes, activating a main function clock acknowledge signal.

14. The method of claim 9, wherein the interrupting the at least one main function clock further includes,
   deactivating a main function clock request signal to the external clock gating circuit,
   maintaining the at least one bus interface clock applied to the at least one bus interface unit, and
   interrupting the at least one main function clock to the main function unit, in response to the main function clock request signal.

15. The method of claim 14, wherein the interrupting the at least one main function clock further includes,
   deactivating a main function clock acknowledge signal applied to the bus interface unit of a slave device.

16. A slave device for supporting a dynamic clock gating, the slave device comprising:
   at least one bus interface unit, the slave device being configured to receive at least one bus interface clock and bus interface signals from a bus coupled to the at least one bus interface unit, and configured to operate independently of at least one main function clock, the at least one main function clock being received by the slave device from an external clock gating circuit.

17. The slave device of claim 16, further including,
   at least one main function unit configured to receive the at least one main function clock and process bus transactions.

18. A slave device for supporting a dynamic clock gating, the slave device comprising:
   at least one bus interface unit configured to receive at least one bus interface clock and bus interface signals from a bus coupled to the at least one bus interface unit, and configured to operate independently of at least one main function clock; and
   at least one main function unit configured to receive the at least one main function clock and process bus transactions, wherein
      the at least one bus interface unit receives a main function clock acknowledge signal from an external clock gating circuit, the main function clock acknowledge signal indicating that the at least one main function clock is applied to the main function unit of the slave device.

* * * * *